United States Patent
Steinbuch et al.

(10) Patent No.: US 9,366,751 B2
(45) Date of Patent: Jun. 14, 2016

(54) METHOD AND DEVICE FOR ASCERTAINING AND COMPENSATING FOR A MISALIGNMENT ANGLE OF A RADAR SENSOR OF A VEHICLE

(71) Applicants: Dirk Steinbuch, Wimsheim (DE); Raik Schnabel, Leonberg (DE)

(72) Inventors: Dirk Steinbuch, Wimsheim (DE); Raik Schnabel, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 163 days.

(21) Appl. No.: 14/250,005

(22) Filed: Apr. 10, 2014

(65) Prior Publication Data

US 2014/0333473 A1    Nov. 13, 2014

(30) Foreign Application Priority Data

May 13, 2013 (DE) .......................... 10 2013 208 735

(51) Int. Cl.
*G01S 7/40* (2006.01)
*G01S 13/93* (2006.01)
*G01S 7/00* (2006.01)
*G01S 13/00* (2006.01)

(52) U.S. Cl.
CPC ............. *G01S 7/4004* (2013.01); *G01S 7/4026* (2013.01); *G01S 13/931* (2013.01); *G01S 2007/403* (2013.01); *G01S 2007/4034* (2013.01); *G01S 2013/9375* (2013.01)

(58) Field of Classification Search
CPC ........... G01S 7/02; G01S 7/40; G01S 7/4004; G01S 7/4026; G01S 2007/403; G01S 2007/4034; G01S 13/88; G01S 13/93; G01S 13/931; G01S 2013/9371; G01S 2013/9375; G01S 7/4021; G01S 13/02; G01S 13/50; G01S 13/52; G01S 13/522; G01S 13/524; G01S 13/5242; F41G 3/22; F41G 7/20; F41G 7/22; F41G 7/226; F41G 7/24; F41G 7/28; F41G 7/34; F41G 7/343
USPC .......... 342/27, 28, 70–81, 165–175, 195, 89, 342/90, 147, 157; 244/3.1, 3.15–3.19; 235/400, 404
See application file for complete search history.

(56) References Cited

U.S. PATENT DOCUMENTS

| | | | | | |
|---|---|---|---|---|---|
| 4,121,209 A | * | 10/1978 | ap Rhys | .............. | G01S 13/5242 342/157 |
| 4,303,211 A | * | 12/1981 | Dooley | ................... | F41G 7/226 244/3.19 |
| 4,698,489 A | * | 10/1987 | Hickin | ...................... | F41G 3/22 235/404 |
| 5,107,269 A | * | 4/1992 | Labozzetta | ........... | G01S 7/4021 342/174 |
| 5,149,011 A | * | 9/1992 | Gratt | ........................ | F41G 7/28 244/3.19 |
| 5,755,400 A | * | 5/1998 | Kalms, III | .............. | F41G 7/343 244/3.17 |

(Continued)

*Primary Examiner* — Bernarr Gregory
(74) *Attorney, Agent, or Firm* — Norton Rose Fulbright US LLP

(57) ABSTRACT

A method for ascertaining and compensating for a misalignment angle of a radar sensor of a vehicle, includes generating a first set of data which contains information about a measured alignment of the radar sensor with respect to an instantaneous movement of the vehicle; generating a second set of data which contains information about a measured alignment of the reference axes defined at the vehicle with respect to the instantaneous movement of the vehicle; ascertaining a misalignment angle by comparing the generated first set of data to the generated second set of data; compensating for the ascertained misalignment angle by changing an emission direction of the main lobe of the antenna characteristic as a function of the ascertained misalignment angle.

18 Claims, 6 Drawing Sheets

(56) References Cited

U.S. PATENT DOCUMENTS

| | | | | |
|---|---|---|---|---|
| 5,964,822 A | * | 10/1999 | Alland | G01S 7/4004 342/90 |
| 5,977,906 A | * | 11/1999 | Ameen | G01S 7/4026 342/165 |
| 6,087,995 A | * | 7/2000 | Grace | G01S 7/4026 342/174 |
| 6,437,731 B1 | * | 8/2002 | Henrio | G01S 7/4026 342/165 |
| 6,900,755 B2 | * | 5/2005 | Richardson | G01S 7/4026 342/174 |
| 7,813,851 B2 | | 10/2010 | Demersseman et al. | |

* cited by examiner

METHOD AND DEVICE FOR ASCERTAINING AND COMPENSATING FOR A MISALIGNMENT ANGLE OF A RADAR SENSOR OF A VEHICLE

FIELD OF THE INVENTION

The present invention relates to a method and a device for ascertaining and compensating for a misalignment angle of a radar sensor of a vehicle.

BACKGROUND

Driver assistance systems are electronic devices in motor vehicles for assisting the driver in certain driving situations. In these systems, safety aspects, but also an increase in driving comfort and mileage improvement, are frequently prioritized. Driver assistance systems intervene semi-autonomously or autonomously into a drive system, a control system (e.g., an accelerator or a brake), or into signaling systems of the vehicle or emit a warning via suitable human-machine interfaces shortly prior to or during critical driving situations.

Known driver assistance systems include, for example, anti-lock systems (ABS), electronic stability programs (ESP), automatic emergency brakes (AEB), and the like. Many driver assistance systems use radar sensors to monitor the surroundings and for distance measurement. The alignment and calibration of such radar sensors are particularly important in this case. In standards, such as ISO 26262, for example, time intervals in which the functionality of radar sensors should be ensured are established.

Since radar sensors are typically installed in or behind the bumper of a vehicle, they may become misaligned by external influences such as minor impacts during parking, falling rocks, snow load, etc., without the vehicle driver immediately noticing. Due to the great reach of such sensors, even a hardly perceivable misalignment by a small misalignment angle may become noticeable in the information which is generated by the radar sensors.

U.S. Pat. No. 7,813,851 describes a misalignment ascertaining method with the aid of which an acceleration along a directional axis, whose alignment with respect to the measuring axis of a forward-directed sensor system is fixed, is measured. The measured acceleration is compared to a predetermined limiting value. If the limiting value is exceeded, the radar sensor may be deactivated. The radar sensor may only be used again after another alignment in a repair shop, for example.

SUMMARY

As noted above, method of U.S. Pat. No. 7,813,851 provides that, after deactivation of the radar sensor, it may only be used again after another alignment in a repair shop. This is disadvantageous because it is an inconvenience.

The present invention provides a method for ascertaining and compensating for a misalignment angle of a radar sensor of a vehicle.

The method according to an example embodiment of the present invention provides the following steps: generating a first set of data which contains information about a measured alignment of the radar sensor with respect to an instantaneous movement of the vehicle; generating a second set of data which contains information about a measured alignment of the reference axes defined at the vehicle with respect to the instantaneous movement of the vehicle; ascertaining a misalignment angle by comparing the generated first set of data to the generated second set of data; compensating for the ascertained misalignment angle by setting an antenna characteristic of the radar sensor, an emission direction of the main lobe of the antenna characteristic being changed as a function of the ascertained misalignment angle.

According to an example embodiment of the present invention, a device is furthermore provided for ascertaining and compensating for a misalignment angle of a radar sensor of a vehicle, including an antenna with a settable antenna characteristic and including a measuring device which is designed to generate a first set of data, which contains information about an alignment of the radar sensor with respect to an instantaneous movement of the vehicle and to generate a second set of data which contains information about an alignment of the reference axes defined at the vehicle with respect to the instantaneous movement of the vehicle. The device includes a computing device which is designed to ascertain a misalignment angle by comparing the generated first set of data to the generated second set of data. The device furthermore includes a control unit which is designed to compensate for the ascertained misalignment angle by setting the antenna characteristic of the radar sensor, the control unit controlling the change in an emission direction of the main lobe of the antenna characteristic as a function of the ascertained misalignment angle.

Example embodiments of the present invention provide a method for ascertaining and compensating for a misalignment angle of a radar sensor of a vehicle with the aid of which an examination and a compensation for the alignment of the radar sensor is possible during the operation of the vehicle. The examination of the alignment may thus be carried out at short and/or at intervals, e.g., at regular intervals.

Furthermore, the present invention provides an option of compensating for a misalignment without a repair shop visit and even during the driving operation of a vehicle, thus making the situation more convenient for the vehicle driver and/or the vehicle owner. According to one preferred example embodiment, the first set of data contains information about an acceleration along the emission direction of the main lobe of the radar sensor. The main lobe of the radar sensor is the space angle in which the largest part of the transmission output is emitted during the emission of radar beams. The first set of data furthermore contains information about an acceleration along a second direction, which is different from the emission direction, with respect to the radar sensor. According to one preferred example embodiment, the second set of data may contain information about accelerations at least along the defined reference axes. The acceleration sensors are already installed in many vehicles as integral parts of other driver assistance systems, so that hardly any additional components are needed.

According to another preferred example embodiment, at least two of the reference axes are linearly independent from one another and preferably stand at a right angle on top of one another. According to another preferred example embodiment, the first set of data contains information about two linearly independent directions with respect to the radar sensor which preferably stand vertically on top of one another. The utilization of direction pairs in which the directions are linearly independent from one another enables measurements of arbitrary accelerations with uniformly small measuring inaccuracies.

According to another preferred example embodiment, a difference between an acceleration along an emission direction of the main lobe of the radar sensor and an acceleration along a first reference axis is computed in order to ascertain the misalignment angle. The first reference axis advantageously corresponds to the setpoint direction for the emission direction of the main lobe of the radar sensor, so that the misalignment angle may be ascertained particularly easily.

According to another preferred example embodiment, a difference between an acceleration along a second direction, which is different from the emission direction, with respect to the radar sensor, and an acceleration along a second reference axis, which is different from the first reference axis, is computed in order to ascertain the misalignment angle. The misalignment angle may be proportional to each of the computed differences. In this case, the ascertainment of the misalignment angle may take place with the aid of predetermined proportionality factors, so that relative measuring inaccuracies do not get bigger in the course of the computations or the ascertainment.

According to another preferred example embodiment, a first reference axis is defined along a vehicle longitudinal axis. A second reference axis along a transverse axis of the vehicle may also be defined. In many vehicles, sensors which contain information about the longitudinal and a transverse axes of the vehicle are already present as integral parts of driver assistance systems, so that only few additional components are necessary for the method according to the present invention.

According to another preferred example embodiment, the emission direction of the main lobe of the antenna characteristic is set with the aid of electronic beam steering by the ascertained misalignment angle. The setting of the antenna characteristic is particularly fast and easy with the aid of beam steering and may take place in the driving vehicle during operation. Alternatively, a part of the radar sensor, which includes the antennas, may be steered mechanically.

According to another preferred example embodiment, the ascertained misalignment angle is compared to a predetermined limiting value. If the predefined limiting value is exceeded, an emergency action is triggered. In this case an optimal response may be ensured in the case of the possible occurrence of a misalignment of an unexpectedly great misalignment angle which may not be compensated for during the driving operation, for example. According to another preferred example embodiment, the triggered emergency action includes the transmission of a visual, acoustic and/or haptic warning signal.

The vehicle driver and/or the vehicle owner may, for example, be notified that he/she should drive to a repair shop in order to remedy the misalignment. The emergency action may also include deactivating the radar sensor. The warning signal may indicate the deactivation of the radar sensor, so that the vehicle driver is notified that the functions provided by the radar sensor are temporarily not available.

According to another preferred example embodiment, the method includes the steps of: receiving radar signals at individual antennas of the radar sensor which operates with the set antenna characteristic, the individual antennas being spaced apart from one another; shifting the phases of the received radar signals by phase shifts, each of which is a function of the ascertained misalignment angle and of the placement of the individual antenna at which a radar signal was received in each case; and generating position data which contain information about positions of objects, which are situated around the vehicle, based on the phase-shifted radar signals. With the aid of this method, the accuracy of the position data provided by the radar sensor may be further improved.

According to one preferred example embodiment, the antenna is designed as a phased-array antenna. Antennas of this type are well suited for electronic beam steering and for a direction-dependent processing of received radar signals.

According to another preferred example embodiment, the vehicle is designed as a motor vehicle which includes an electronic stability program whose acceleration sensors are designed to measure the accelerations of the motor vehicle along the reference axes in order to generate the second set of data.

The above-mentioned embodiments may be combined in any desired manner, provided that the combination is reasonable. Other possible embodiments, refinements, and implementations of the present invention also include not explicitly named combinations of features of the present invention described previously or in the following with respect to the example embodiments. In particular, those skilled in the art will add individual aspects as improvements or enhancements to the particular base form of the present invention.

The present invention is elucidated below in greater detail with reference to the example embodiments indicated in the schematic figures of the drawings, in all of which elements and devices which are identical or provide identical functions are identified with identical reference numerals, unless otherwise indicated. Although method steps are provided with reference numerals which include numbers, a sequence is not established thereby, in particular, multiple method steps may also take place simultaneously. The graphic illustration of the method steps in the drawings is used only for the sake of illustration and is not supposed to establish a chronological or causal dependence of the method steps.

DETAILED DESCRIPTION

Figure 1:
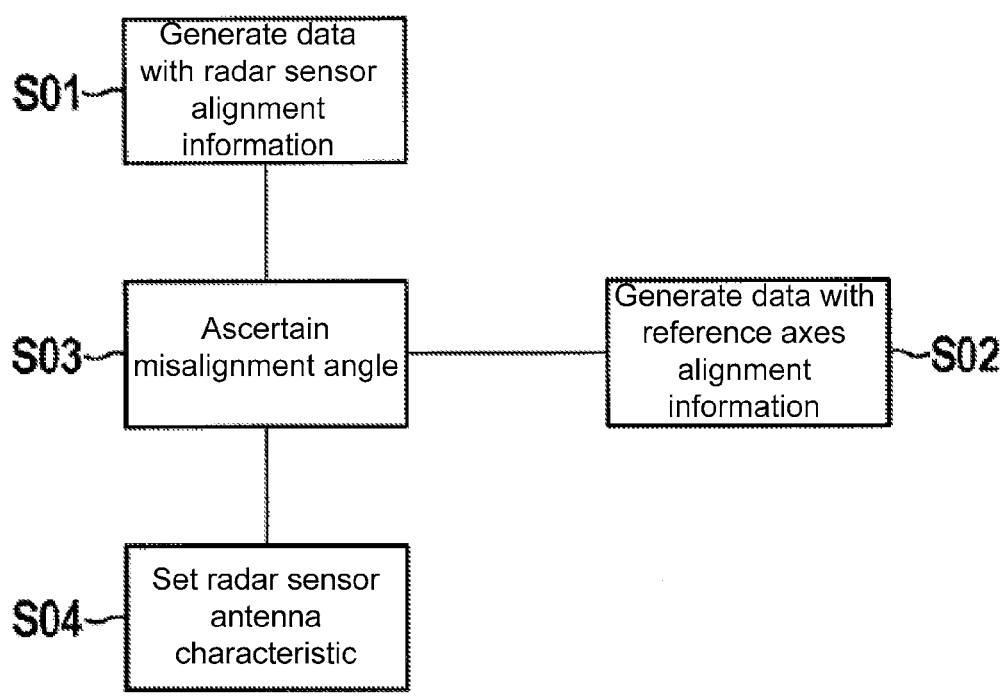
FIG. 1 is a flow chart that illustrates a method according to a first example embodiment of the present invention.

FIG. 1 is a flow chart that illustrates a method according to a first example embodiment of the present invention. In the following description of FIG. 1, reference is also made to the reference numerals of FIG. 2.

In a first step S01, a first set of data is generated which contains information about a measured alignment of radar sensor 2 with respect to an instantaneous movement of vehicle 1. In a setpoint state, emission direction 45 of the main lobe of the antenna characteristic of radar sensor 2 is positioned, with respect to its horizontal alignment, in the same direction as a vehicle longitudinal axis 35 of vehicle 1. In other words, the setpoint state of a horizontal component of emission direction 45 is exactly aligned in the driving direction of vehicle 1 if the vehicle drives straight ahead. In the actual state, emission direction 45 may deviate from vehicle longitudinal axis 35. The difference between the setpoint state and the actual state is described by misalignment angle 20. In one case, based on which the method is described according to the first example embodiment, the misalignment is purely horizontal, i.e., emission direction 45 is only tilted in the horizontal from a parallel to vehicle longitudinal axis 35 by a misalignment angle 20. The method may, however, be carried out just as well in the case of a purely vertical misalignment or a combination of a horizontal and a vertical misalignment. The setpoint state of a vertical component of emission direction 45 may in this case be zero, i.e., emission direction 45 may be parallel to a planar roadway; in the setpoint state, the vertical component may, however, also assume positive or negative gradient values, i.e., be aligned obliquely up or down.

According to the method according to the first example embodiment, the first set of data is generated by an acceleration measuring device 4 which is an integral part of radar sensor 2. Acceleration measuring device 4 measures the instantaneous acceleration of radar sensor 2 in the direction of emission direction 45, as well as in the direction of a second direction 42 which stands perpendicularly on the emission direction. In the case selected for the description of the first example embodiment, second direction 42 is in the same horizontal plane as emission direction 45 and vehicle longitudinal axis 35. This means that in the setpoint state, a straight line through the second direction is parallel to a vehicle transverse axis 32, 34 of vehicle 1. The measured accelerations are caused by the instantaneous movement of vehicle 1.

In a second step S02, a second set of data is generated which contains information about a measured alignment of reference axes 32, 34, 35, which are defined at vehicle 1, with respect to the instantaneous movement of vehicle 1. According to the method according to the first example embodiment, vehicle 1 includes an acceleration sensor 8 which is fixedly connected to vehicle 1 and is aligned with respect to vehicle 1. Acceleration sensor 8 is designed and situated in such a way that it measures accelerations along vehicle longitudinal axis 35 and along vehicle transverse axis 34. Acceleration measuring device 4 may also be designed in such a way that it also measures accelerations along a third direction 48 which is vertical and is perpendicular to both emission direction 45 and on second direction 42.

According to an example embodiment, acceleration measuring sensor 8 is designed in such a way that it also measures accelerations along a third vehicle axis 38 which is vertical and is perpendicular to both vehicle longitudinal axis 35 and vehicle transverse axis 34.

In a method step S03, a misalignment angle 20 is ascertained with the aid of computing device 12 by comparing the generated first set of data to the generated second set of data. According to the method according to the first example embodiment, acceleration $a_{ref,hor}$, which is measured by acceleration sensor 8 in the direction of vehicle longitudinal axis 35, is subtracted from acceleration $a_{sens,hor}$ which is measured by acceleration measuring device 4 in emission direction 45. In the simplest case, misalignment angle 20 may be essentially proportional to difference $a_{just,hor} = a_{sens,hor} - a_{ref,hor}$, depending on the relative position of acceleration measuring device 4 and acceleration sensor 8.

If, as described above, accelerations along a third direction 48 and along a third vehicle axis 38 are measured, a difference $a_{just,vert} = a_{sens,vert} - a_{ref,vert}$ may also be computed. In this case, $a_{sens,vert}$ is an acceleration which is measured in the third direction by acceleration measuring device 4 and $a_{ref,vert}$ is an acceleration which is measured in the direction of the third vehicle axis by acceleration sensor 8. Depending on the relative positions of acceleration measuring device 4 and acceleration sensor 8, the misalignment angle may also be proportional to difference $a_{just,vert}$.

Misalignment angle 20 may be ascertained S03 based on the geometric position relation regardless of the placement of radar sensor 2 with respect to acceleration sensor 8. The relative position between radar sensor 2 and acceleration sensor 8 may be ascertained in a factory or in a vehicle repair shop after an alignment and stored for the regular driving operation, but it is also possible for a measurement of the relative position to take place during the driving operation and for the result to be used for ascertaining S03 misalignment angle 20.

In a method step S04, ascertained misalignment angle 20 is compensated for by setting an antenna characteristic of radar sensor 2 with the aid of a control unit 10. In other words, a state is established which corresponds to the setpoint state. In order to set the antenna characteristic, the main lobe of the antenna characteristic is changed as a function of ascertained misalignment angle 20.

According to the first example embodiment, radar sensor 2 includes a phased-array antenna 3 which includes a plurality of individual antennas. The antenna characteristic is changed with the aid of electronic beam steering. The antenna characteristic is thus changed in a targeted manner in such a way that it corresponds to the emission in an aligned case, i.e., in the case of a misalignment angle of zero degrees, with respect to the vehicle. In this way, the desired detection field is reinstated which is usually symmetrical to a driving direction of the vehicle if the vehicle is being driven straight ahead. If the radar sensor is, for example, misaligned by one degree to the right in the horizontal, it may be ensured by changing the antenna configuration that the entire antenna characteristic is steered by one degree to the left.

Figure 2:
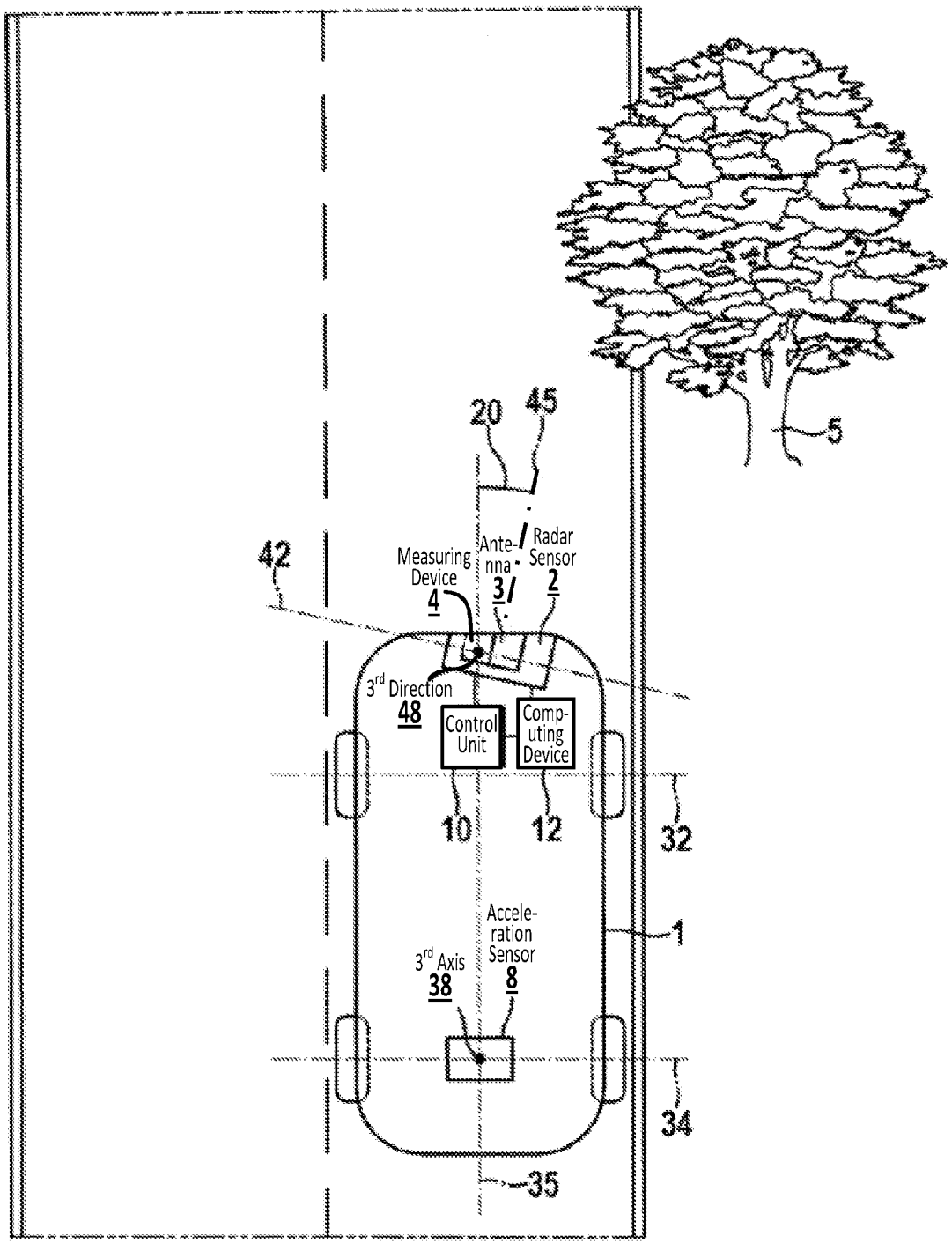
FIG. 2 shows a schematic top view of a vehicle for explaining the method according to the first example embodiment of the present invention.

FIG. 2 shows a schematic top view of a vehicle for explaining the method according to the first example embodiment of the present invention.

Vehicle 1 includes in this case radar sensor 2 including antenna 3 and acceleration measuring device 4. In the figure, antenna 3 and acceleration measuring device 4 are plotted separately, but they are advantageously situated very closely to one another. For example, acceleration measuring device 4 may be integrated directly into a high-frequency generating semiconductor body of antenna 3 or its housing. Emission direction 45, second direction 42, along which accelerations may be measured, and third direction 48, along which acceleration may be measured, intersect essentially at one point.

Vehicle 1 moreover includes acceleration sensor 8 which is able to measure accelerations along vehicle longitudinal axis 35, vehicle transverse axis 34 and/or along third vehicle axis 38. Acceleration sensor 8 may be designed as a compact unit or else as a network of individual acceleration sensor units. For example, an acceleration sensor unit may also measure an acceleration along vehicle transverse axis 32. For the sake of clarity, acceleration sensor 8 is plotted down at a comparatively great distance from radar sensor 2. The two sensors 2, 8 may, however, also be situated very closely to one another, thus making the computations even more precise. It should only be ensured that the position relation between acceleration sensor 8 and radar sensor 2 is known and/or may be measured and that acceleration sensor 8 cannot be misaligned by the same external influences as radar sensor 2.

Misalignment angle 20 is enclosed by emission direction 45 and vehicle longitudinal axis 35. A tree 5 represents an object in FIG. 2 with respect to which the vehicle driver is interested in the distance and alignment of vehicle 1.

Figure 3:
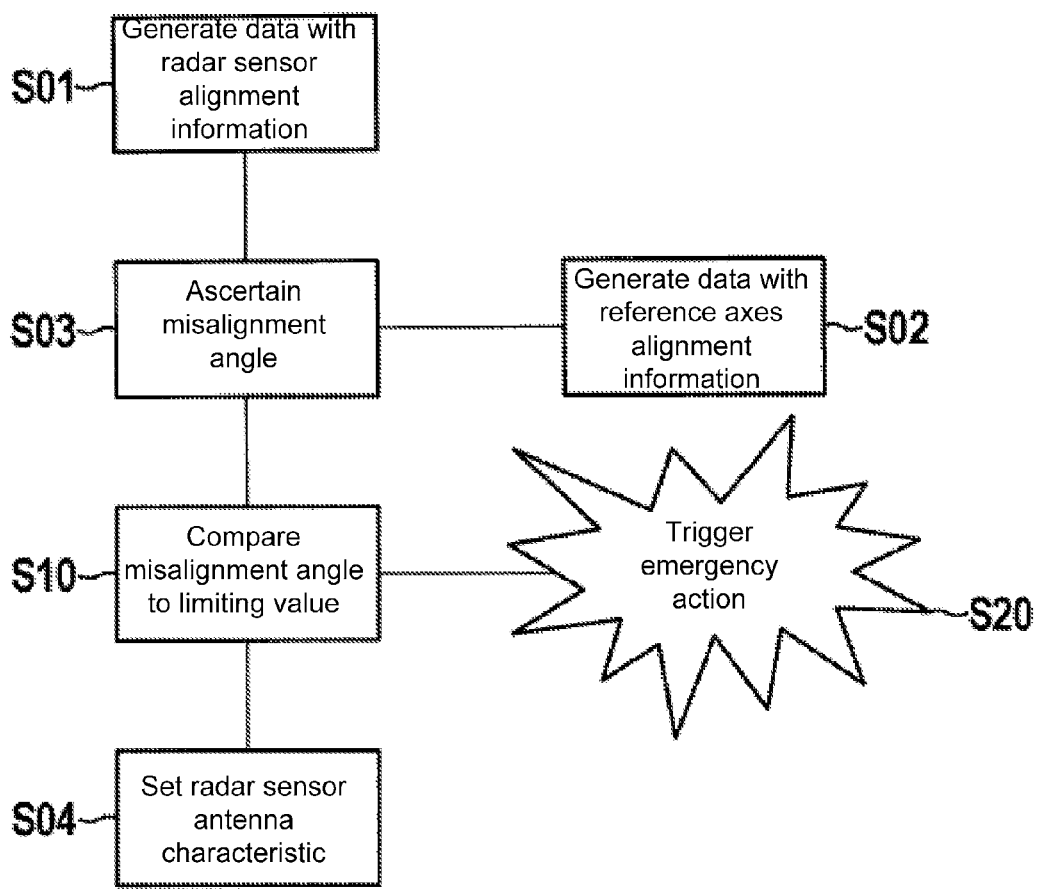
FIG. 3 is a flow chart that illustrates a method according to a second example embodiment of the present invention.

FIG. 3 shows a flow chart for explaining a method according to a second example embodiment of the present invention.

The method according to the second example embodiment essentially corresponds to the method according to the first example embodiment, and also includes steps S10 and S20.

After ascertaining S03 misalignment angle 20, ascertained misalignment angle 20 is compared in a method step S10 to a predetermined limiting value according to the method according to the second example embodiment. If ascertained misalignment angle 20 exceeds the limiting value, an emergency action is triggered in a method step S20.

The emergency action may include a visual, acoustic and/or haptic warning signal and/or deactivation of radar sensor 2.

Figure 4:
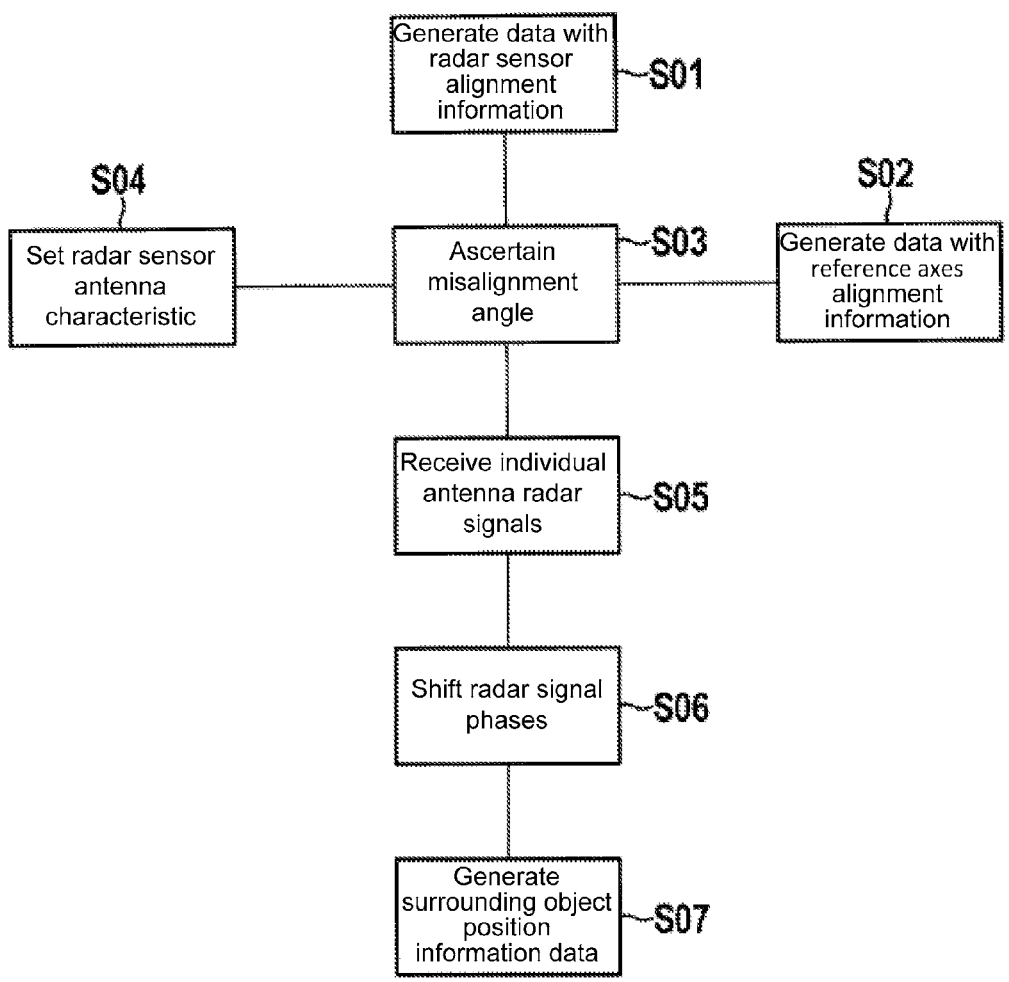
FIG. 4 is a flow chart that illustrates a method according to a third example embodiment of the present invention.

FIG. 4 is a flow chart for explaining a method according to a third example embodiment of the present invention.

The method according to the third example embodiment essentially includes the same steps as the method according to the first example embodiment, and also includes steps S05-S07.

In a method step S05, radar signals are additionally received at individual antennas of radar sensor 2 which operates with the set antenna characteristic, the individual antennas being spaced apart from each other. The individual antennas may be part of a phased-array antenna 3. The radar signals may be emitted by phased-array antenna 3 which operates with the set antenna characteristic.

Signals with amplitudes and phases, which are a function of the placement of the corresponding individual antenna and ascertained misalignment angle 20, are received at the individual antennas. In a method step S06, the phases of the received radar signals are shifted electronically and/or arithmetically by phase shifts which are computed as a function of ascertained misalignment angle 20 and as a function of the placement of the corresponding individual antenna which has received a certain radar signal. According to an example embodiment, the amplitudes of the received radar signals are also changed. In a method step S07, position data are generated which contain information about positions of objects 5 situated around vehicle 1. The computations necessary to generate position data are based on the phase-shifted radar signals.

Figure 5:
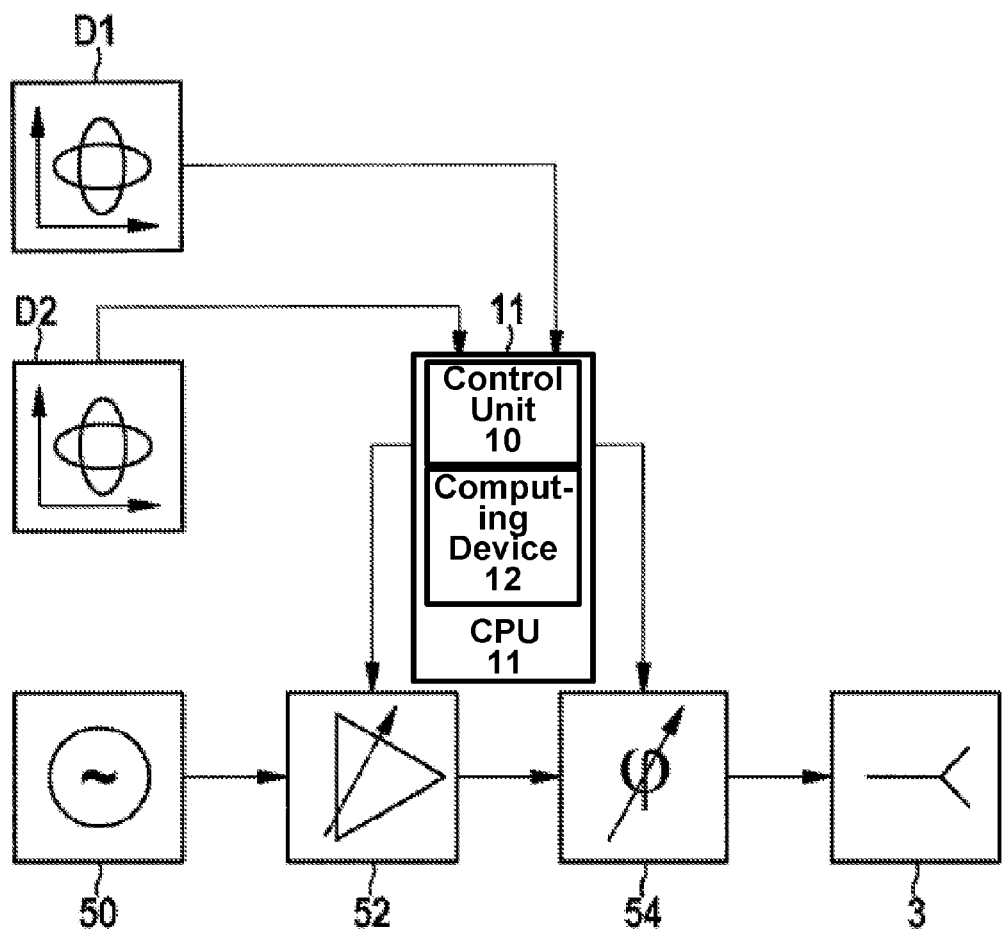
FIG. 5 is a block diagram for explaining the method according to the third example embodiment of the present invention.

FIG. 5 shows a block diagram for explaining the method according to the third example embodiment of the present invention.

According to FIG. 5, first set of data D1 and second set of data D2 are made available to control unit 10 and computing device 12. Control unit 10 and computing device 12 may be integrated into an arithmetic logic unit (ALU) or into a central processor unit (CPU) 11.

Control unit 10 controls and/or regulates an amplitude modulator 52 and/or a phase shifter 54 which modulate(s) a signal 50 made available by antenna 3 and/or the individual antennas of antenna 3. The method is suitable for an arbitrary number of channels, which are assigned to individual antennas, as well as for arbitrary numbers and characteristics of amplifying and/or phase-shifting elements 52, 54.

Figure 6:
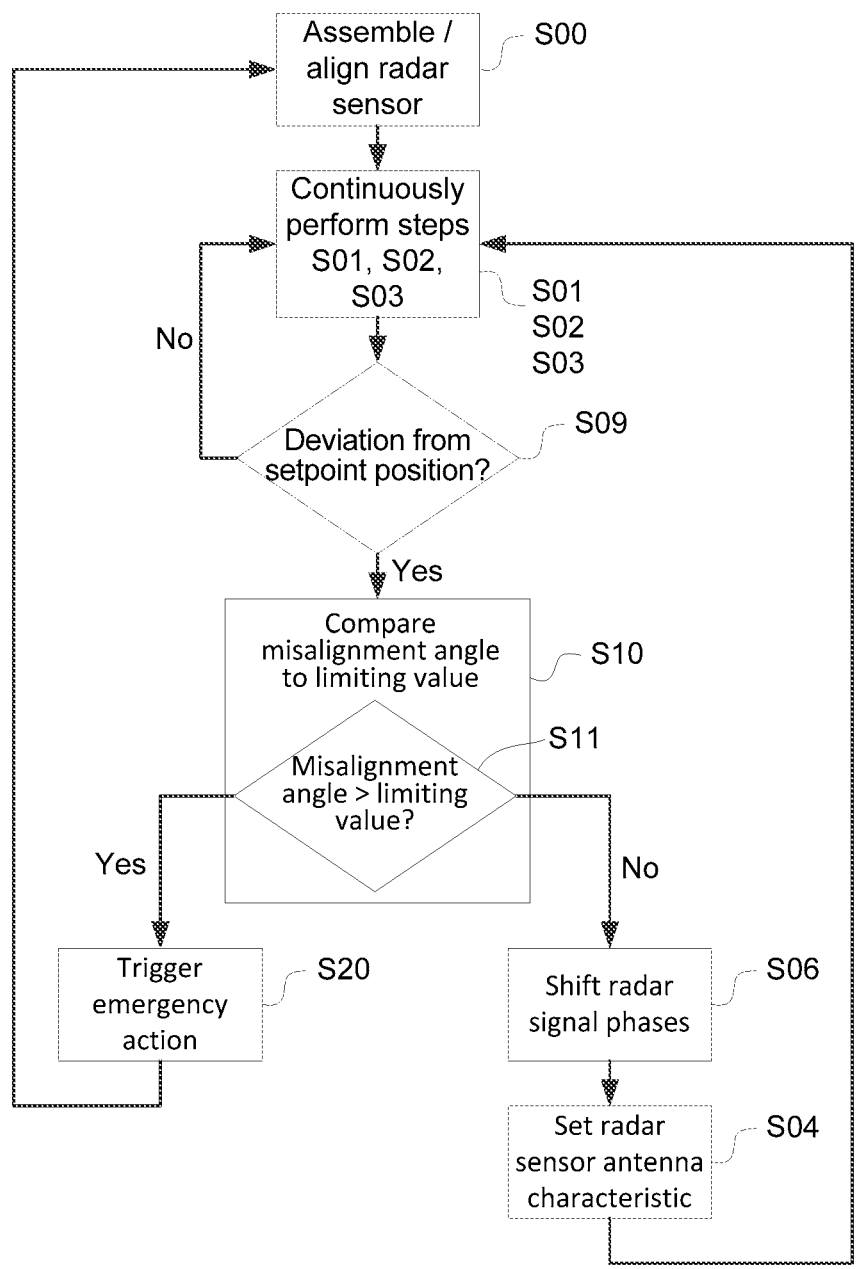
FIG. 6 is a flow chart that illustrates a method according to a fourth example embodiment of the present invention.

FIG. 6 is a flow chart for explaining a method according to a fourth example embodiment of the present invention.

According to the fourth example embodiment, an assembly and/or alignment of radar sensor 2 is carried out in a factory or a repair shop in method step S00. Method steps S01, S02, and S03 are carried out continuously during the driving operation. In a method step S09, it is checked whether a deviation from the setpoint position is present. Such a deviation is present if ascertained misalignment angle 20 or one of multiple, ascertained misalignment angles 20 is not within a tolerance of approximately zero degrees. If such a deviation is not established, the normal driving operation is continued with method steps S01, S02, and S03. If a deviation of the setpoint position is ascertained, ascertained misalignment angle 20 is compared to the predetermined limiting value in method step S10. In a method step S11, which is a part of method step S10, it is established whether ascertained misalignment angle 20 exceeds the predetermined limiting value. If this is the case, the emergency action is triggered S20. According to the fourth example embodiment, a repair shop visit is intended after triggering S20 the emergency action, where assembly and/or alignment S00 of radar sensor 2 is/are repeated.

If ascertained misalignment angle 20 does not exceed the predetermined limiting value, i.e., if ascertained misalignment angle 20 is greater than zero degrees, but less than the predetermined limiting value, method steps S04-S06, which are known from the previous description, are carried out. Subsequently, the normal driving operation may be continued during which steps S01, S02, and S03 are carried out continuously.

Although the present invention was described above with reference to preferred example embodiments, it is not limited thereto, but is modifiable in many ways. In particular, the present invention may be changed or modified in various ways without deviating from the core of the present invention.

For example, a plurality of sensors may be used to generate the first and the second sets of data, e.g., miniaturized or non-miniaturized inertial sensors and/or position sensors which may be integrated into microelectromechanical systems (MEMS). Modern vehicle dynamics systems include a plurality of sensors which may be available on a bus system of the vehicle. An ESP which is present in the vehicle may include a reference sensor which may generate the second set of data, so that additional external aids are not necessary for the methods according to the present invention.

What is claimed is:

1. A method for ascertaining and compensating for a misalignment angle of a radar sensor of a vehicle, the method comprising:
   generating a first set of data which contains information about an instantaneous movement of the vehicle with respect to an alignment of the radar sensor;
   generating a second set of data which contains information about the instantaneous movement of the vehicle with respect to an alignment of at least one defined reference axis of the vehicle;
   ascertaining, by processing circuitry, a misalignment angle by comparing the generated first set of data to the generated second set of data; and
   compensating, by the processing circuitry, for the ascertained misalignment angle by changing an emission direction of a main lobe of an antenna arrangement of the radar sensor as a function of the ascertained misalignment angle.

2. The method of claim 1, wherein at least one of:
   the first set of data contains information about an acceleration along the emission direction of the main lobe of the radar sensor and along a second direction that is defined relative to the radar sensor and that is different from the emission direction; and
   the second set of data contains information about accelerations at least along the at least one defined reference axis.

3. The method of claim 1, wherein at least one of:
   the second data contains data concerning at least two of reference axes that are perpendicular to each other; and
   the first set of data contains information about two directions that are perpendicular to each other.

4. The method of claim 3, wherein:
the comparison includes a first comparison between an acceleration along the emission direction of the main lobe of the radar sensor and an acceleration along a first one of the at least one reference axis, and a second comparison between an acceleration along a second direction defined relative to the radar sensor and an acceleration along a second one of the at least one reference axis;
the second reference axis is different than the first reference axis; and
the ascertainment of the misalignment angle is based on both comparisons.

5. The method of claim 1, wherein a first of the at least one reference axis is defined along a longitudinal axis of the vehicle.

6. The method of claim 5, wherein a second of the at least one reference axis is a transverse axis of the vehicle.

7. The method of claim 1, wherein the changing of the emission direction of the main lobe of the radar sensor is performed via electronic beam steering.

8. The method of claim 1, further comprising:
comparing the ascertained misalignment angle to a predetermined threshold; and
triggering an emergency action responsive to a determination that the predefined threshold is exceeded.

9. The method of claim 8, wherein the triggered emergency action includes at least one of transmitting a warning signal and deactivating the radar sensor.

10. The method of claim 1, further comprising:
receiving radar signals at individual antennas of the antenna arrangement of the radar sensor, wherein the individual antennas are spaced apart from each other;
shifting a phases of the received radar signals by phase shifts, wherein each one of the respective phase shifts is a function of the ascertained misalignment angle and of the respective placement of the respective individual antenna at which the radar signal was received; and
generating position data which contain information about the position of an object situated about the vehicle based on the phase-shifted radar signals.

11. A radar sensor arrangement for a vehicle, the radar sensor arrangement comprising:
a radar sensor that includes an antenna arrangement;
a measuring device configured to:
generate a first set of data, which contains information about an instantaneous movement of the vehicle with respect to an alignment of the radar sensor; and
generate a second set of data which contains information about the instantaneous movement of the vehicle with respect to an alignment of at least one defined reference axis of the vehicle; and
processing circuitry configured to:
ascertain a misalignment angle by comparing the generated first set of data to the generated second set of data; and
compensate for the ascertained misalignment angle by changing an emission direction of a main lobe of the antenna arrangement as a function of the ascertained misalignment angle.

12. The radar sensor arrangement of claim 11, wherein the antenna arrangement is a phased-array antenna.

13. The radar sensor arrangement of claim 11, wherein the vehicle is a motor vehicle which includes an electronic stability program (ESP) whose acceleration sensors are configured to measure accelerations of the motor vehicle along the at least one defined reference axis to generate the second set of data.

14. A method for ascertaining and compensating for a misalignment angle of a radar sensor of a vehicle, the method comprising:
obtaining, by processing circuitry and from a sensor arrangement, a first sensed acceleration in a direction of a main lobe of an antenna arrangement of the radar sensor;
obtaining, by the processing circuitry and from the sensor arrangement, a second sensed acceleration along a longitudinal axis of the vehicle;
determining, by the processing circuitry, a difference between the accelerations;
determining, by the processing circuitry and based on the determined difference, a misalignment angle; and
changing, by the processing circuitry and based on the determined misalignment angle, at least one of (a) the direction of the main lobe of the antenna arrangement, and (b) a radar signal obtained via from the antenna arrangement.

15. The method of claim 14, wherein the radar signal is changed in the changing step, and the change is of a phase of the radar signal.

16. The method of claim 14, wherein the radar signal is changed in the changing step, and the change is of an amplitude of the radar signal.

17. The method of claim 14, wherein the direction of the main lobe of the antenna arrangement is changed in the changing step.

18. The method of claim 14, further comprising:
obtaining, by the processing circuitry and from the sensor arrangement, a third sensed acceleration at a location of the radar sensor and in a direction that is (a) perpendicular to the main lobe of the antenna arrangement of the radar sensor and (b) vertical with respect to the vehicle;
obtaining, by the processing circuitry and from the sensor arrangement, a fourth sensed acceleration at a location that is at a distance from the radar sensor and along an axis that is (a) perpendicular to the longitudinal axis of the vehicle and (b) vertical with respect to the vehicle; and
determining, by the processing circuitry, a difference between the third and fourth accelerations, wherein the determination of the misalignment angle is further based on the difference between the third and fourth accelerations.

* * * * *